(12) United States Patent
Hang et al.

(10) Patent No.: US 11,380,982 B2
(45) Date of Patent: Jul. 5, 2022

(54) MOLDING DESIGNS FOR HELICAL ANTENNAS

(71) Applicants: Molex CVS Grand Blanc, LLC, Plymouth, MI (US); Laird Technologies, Inc., Chesterfield, MO (US)

(72) Inventors: Chit Yong Hang, Penang (MY); Azlan Shah Md Desah, Penang (MY); Kok Min Ong, Penang (MY); Hasan Yasin, Grand Blanc, MI (US); Joseph Michael Combi, Grand Blanc, MI (US)

(73) Assignee: Molex CVS Grand Blanc, LLC, Plymouth, MI (US)

( * ) Notice: Subject to any disclaimer, the term of this patent is extended or adjusted under 35 U.S.C. 154(b) by 312 days.

(21) Appl. No.: 16/460,717

(22) Filed: Jul. 2, 2019

(65) Prior Publication Data

US 2019/0334229 A1    Oct. 31, 2019

Related U.S. Application Data

(63) Continuation of application No. PCT/US2018/012157, filed on Jan. 3, 2018.

(30) Foreign Application Priority Data

Jan. 4, 2017 (MY) .............................. PI2017700031

(51) Int. Cl.
*B29C 45/12* (2006.01)
*H01Q 1/36* (2006.01)
(Continued)

(52) U.S. Cl.
CPC .............. *H01Q 1/362* (2013.01); *B29C 45/14* (2013.01); *B29C 45/1671* (2013.01); *B29C 45/1675* (2013.01); *H01Q 1/3275* (2013.01)

(58) Field of Classification Search
CPC ...... H01Q 1/362; B29C 45/14; B29C 45/1675
See application file for complete search history.

(56) References Cited

U.S. PATENT DOCUMENTS

| 6,163,300 A | 12/2000 | Ishikawa et al. |
| 6,244,653 B1 * | 6/2001 | Nishio ................... B29C 45/16 296/201 |

(Continued)

FOREIGN PATENT DOCUMENTS

| CN | 104810625 A | 7/2015 |
| CN | 104810625 A | 7/2015 |

(Continued)

OTHER PUBLICATIONS

Chinese office action for Chinese application No. 201880013274.0 that claims priority to the same parent application as the instant application, 4 pages, dated Oct. 29, 2020.

(Continued)

*Primary Examiner* — Alison L Hindenlang
*Assistant Examiner* — Debjani Roy
(74) *Attorney, Agent, or Firm* — Harness, Dickey & Pierce, P.L.C.; Anthony G. Fussner

(57) ABSTRACT

Exemplary embodiments are provided of molding designs and methods for helical antennas. In an exemplary embodiment, a method generally includes placing an antenna element between a top mold core and a first bottom mold core, and injecting molding material into a first mold cavity defined by at least the top mold core, thereby forming a top portion of a helical antenna housing and two opposite side portions of the helical antenna housing. The method also includes removing the first bottom mold core and placing a second bottom mold core about the antenna element, and injecting molding material into a second mold cavity defined (Continued)

FIG. 1A by at least the second bottom mold core, thereby forming a bottom portion of the helical antenna housing.

19 Claims, 17 Drawing Sheets

(51) Int. Cl.
*B29C 45/16* (2006.01)
*H01Q 1/32* (2006.01)
*B29C 45/14* (2006.01)

(56) References Cited

U.S. PATENT DOCUMENTS

| | | | | |
|---|---|---|---|---|
| 7,671,812 | B1* | 3/2010 | Yasin | H01Q 1/3275 |
| | | | | 343/715 |
| 8,963,786 | B2 | 2/2015 | Kowalewicz et al. | |
| 2001/0054780 | A1 | 12/2001 | Ogura | |
| 2003/0145452 | A1* | 8/2003 | Joly | H01Q 1/3275 |
| | | | | 29/601 |
| 2003/0146546 | A1* | 8/2003 | Curtil | B29C 45/332 |
| | | | | 264/328.7 |
| 2004/0100417 | A1 | 5/2004 | Ohno et al. | |
| 2007/0024519 | A1 | 2/2007 | Blickle | |
| 2009/0021445 | A1 | 1/2009 | Knudsen et al. | |
| 2012/0088004 | A1* | 4/2012 | Wu | B29C 45/332 |
| | | | | 425/444 |
| 2014/0084510 | A1* | 3/2014 | Shimizu | H05K 5/0073 |
| | | | | 264/261 |
| 2015/0214607 | A1* | 7/2015 | Lee | H01Q 1/3275 |
| | | | | 29/600 |

FOREIGN PATENT DOCUMENTS

| | | |
|---|---|---|
| JP | H11284427 A | 10/1999 |
| KR | 1020040045385 A | 6/2004 |
| KR | 20110122405 A | 11/2011 |
| WO | WO-2018/129019 A2 | 7/2018 |

OTHER PUBLICATIONS

Chinese office action for Chinese application No. 201880013274.0 (published as CN11035339 on Oct. 11, 2019) that claims priority to the same parent application as the instant application, 4 pages, dated Oct. 29, 2020.

International Search Report and Written Opinion dated Oct. 26, 2018 issued in PCT Application Serial No. PCT/US2018/012157. Both the instant application and PCT/US2018/012157 have inventors in common and have priority claims related to Malaysian Application No. PI2017700031.

\* cited by examiner

MOLDING DESIGNS FOR HELICAL ANTENNAS

CROSS-REFERENCE TO RELATED APPLICATIONS

This application is a continuation of PCT International Application PCT/US2018/012157 filed Jan. 3, 2018 (published on Jul. 12, 2018 as WO 2018/129019), which, in turn, claims priority to and the benefit of Malaysian Patent Application No. PI2017700031 filed Jan. 4, 2017. The entire disclosures of the above applications are incorporated herein by reference.

FIELD

The present disclosure generally relates to helical antenna housings and corresponding molding methods.

BACKGROUND

This section provides background information related to the present disclosure which is not necessarily prior art.

A helical mast antenna is a common design for antennas attached to vehicles. The helical shape may reduce noise generated by the antenna while the vehicle is traveling at high speed. Some helical mast antennas may be manufactured using cables windings and shrink tubes to form the desired helical shape.

DRAWINGS

The drawings described herein are for illustrative purposes only of selected embodiments and not all possible implementations, and are not intended to limit the scope of the present disclosure.

Corresponding reference numerals indicate corresponding (although not necessarily identical) parts throughout the several views of the drawings.

DETAILED DESCRIPTION

Figure 1B:
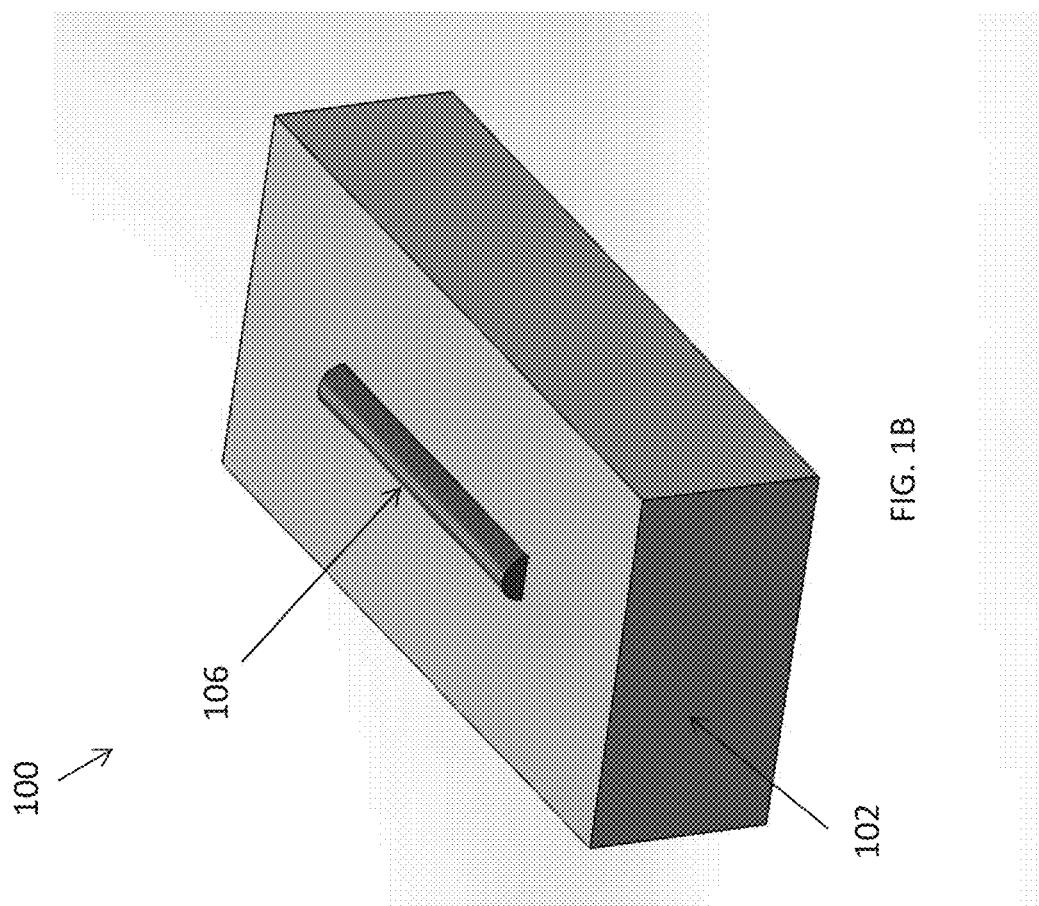
FIGS. 1A and 1B are perspective views of a bottom mold cavity for a helical antenna according to one example embodiment of the present disclosure.

Example embodiments will now be described more fully with reference to the accompanying drawings.

Some vehicles include antennas (e.g., mast antennas, etc.) having a helical spring shape design. The helical shape design may reduce noise effects of the antenna while the vehicle is moving at high speed. Some helical antenna housing designs can be created using cable winding and heat shrink tube around the antenna. Other helical antenna housing designs can be created using a cavity mold approach (e.g., a half and half molding concept, etc.).

Some conventional half and half molding approaches provide difficulties when the antenna housing includes undercut features such as the helical spring shape. The molded antenna housing may stick to the mold cavity, be harder to release from the mold cavity, etc. This may create cosmetic appearance issues, affect the straightness of the antenna housing, etc.

Exemplary embodiments are provided herein of molding designs for helical antennas (e.g., helical mast antenna housings, etc.). In some embodiments, a half and half molding process is disclosed that uses a top cavity and one or more bottom cavity injections. Some embodiments may incorporate a four way tooling design into the half and half molding process to reduce the effects of releasing undercut features of the molded antenna housing due to the helical design.

The antenna housing may be divided into four portions (e.g., quarters, etc.): a top portion, a bottom portion, a left portion, and a right portion. The top portion of the antenna housing may be formed by a top mold cavity, and the bottom portion of the antenna housing may be formed by a bottom mold cavity. Two additional side sliders can be embedded in the top mold cavity to form the left and right portions of the antenna housing.

In one example approach, the internal antenna element is loaded into a first bottom mold cavity of the tooling apparatus. The mold is closed and a first shot of antenna housing material (e.g., plastic molding material, thermoplastic polyurethane, etc.) is injected to mold the top portion, left portion, and right portion of the antenna housing. The partial molded antenna housing can remain in (e.g., stick to, etc.)

the top cavity after the mold is opened, due to the undercut features of the helical antenna housing shape.

Another bottom cavity can then be joined with the top cavity to form the remaining bottom portion by injecting a second shot of antenna housing material (e.g., molding material, etc.). After the second injection is finished, the mold can be opened while activating side sliders to release the molded antenna housing. For example, the side sliders may slide away from the left and right portions of the antenna housing to release the undercut features of the helical antenna housing design. The finished molded antenna housing may then rest in the bottom mold cavity and can be removed by an operator, machine, etc. The antenna housing may have multiple parting lines (e.g., four parting lines, etc.) after molding is finished.

Some of the example embodiments disclosed herein may provide one or more (or none) of the following advantages: increasing the ability to mold antenna housing components having undercut features (e.g., a helical spring design, etc.), increasing the ability of antenna mold cavities to release molded antenna housings having undercut features, simplifying the antenna molding process using a half and half molding approach, improving the aesthetics of molded antenna housings (e.g., by reducing cosmetic issues during molding, etc.), etc.

Figure 1A:
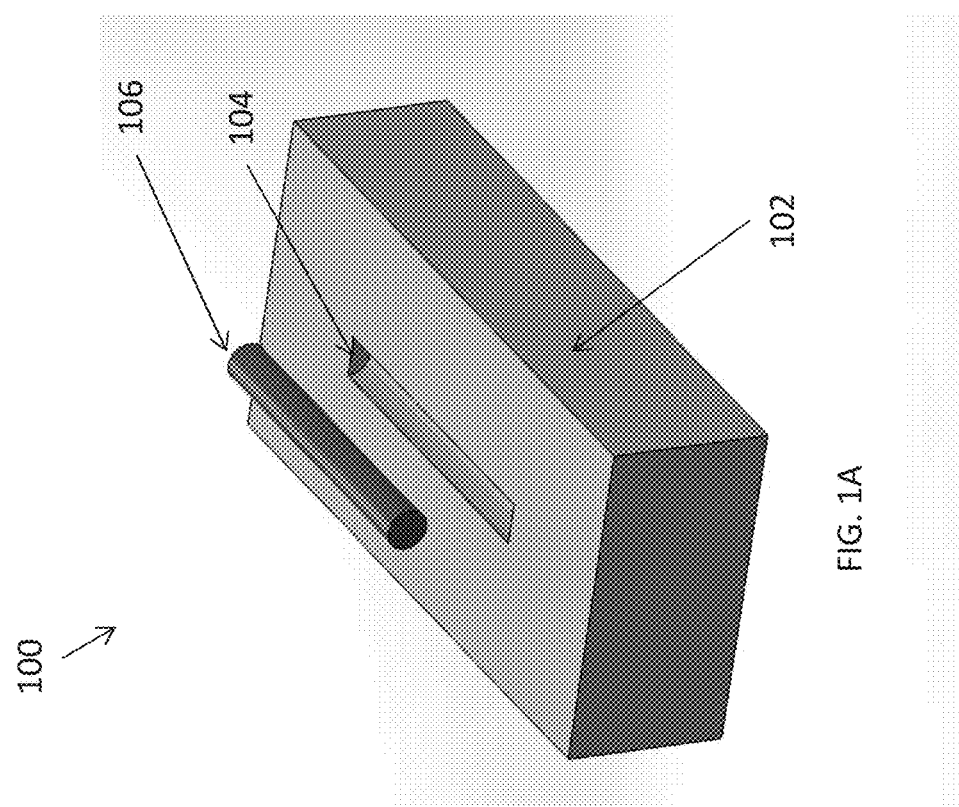

Referring now to the figures, FIGS. 1A and 1B illustrate a bottom mold core 102 having a bottom mold cavity 104 for molding a helical antenna (e.g., a helical mast antenna housing, etc.). An antenna element 106 is inserted into the bottom mold cavity 104 of the bottom mold core 102. FIG. 1A illustrates the antenna element 106 before it is inserted into the bottom mold cavity 104, and FIG. 1B illustrates the antenna element 106 received in the bottom mold cavity 104.

As shown in FIG. 1A, the antenna element 106 may be sized to fill the bottom mold cavity 104, such that molding injection material will not contact the bottom side of antenna element 106 when the antenna element 106 is received in the bottom mold cavity 104.

Figures 2A, 2B:
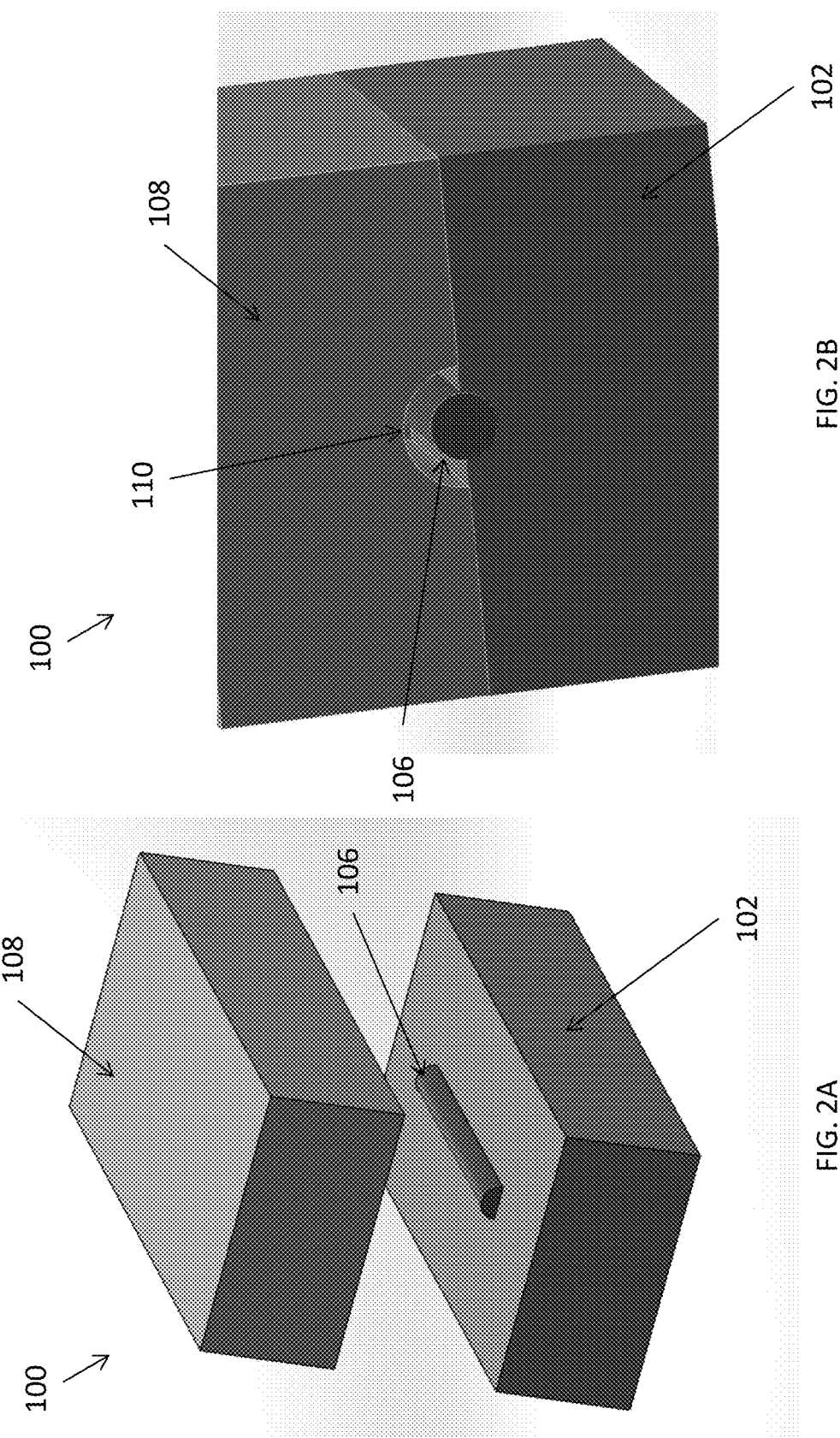
FIGS. 2A and 2B are perspective views of the mold of FIG. 1A including a top mold cavity.

FIG. 2A illustrates a top mold core 108 positioned above the bottom mold core 102 and the antenna element 106 before the mold 100 is closed. FIG. 2B illustrates the mold 100 in a closed position with the top mold core 108 contacting the bottom mold core 102. As shown in FIGS. 2A and 2B, the top mold core 108 and bottom mold core 102 may have substantially parallel, flat, etc. surfaces that contact one another when the mold 100 is in a closed position.

The top mold core 108 includes a top mold cavity 110. As illustrated in FIG. 2B, the top mold cavity 110 is larger than the antenna element 106 (e.g., the top mold cavity 110 has a larger radius than the antenna element 106, etc.). This difference in size between the top mold cavity 110 and the antenna element 106 leaves a gap above the antenna element 106 when the mold is closed. As shown in FIG. 2B, the antenna element 106 may be positioned such that about a lower half of the antenna element is disposed below a plane of contact between the top mold core 108 and the bottom mold core 102, and about an upper half of the antenna element is disposed above the plane of contact between the top mold core 108 and the bottom mold core 102.

Figures 3A, 3B:
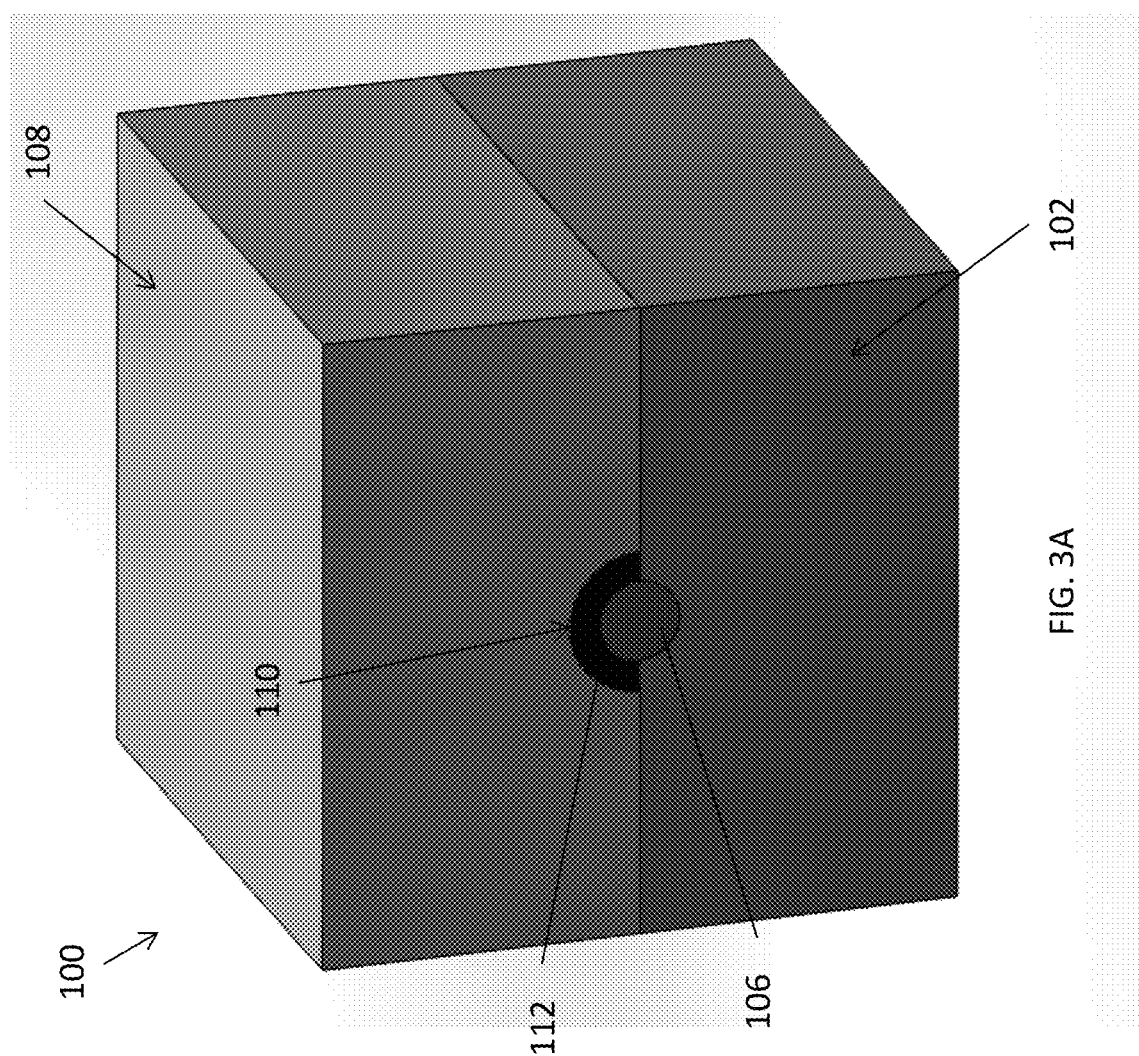
FIG. 3A is a perspective view of the mold of FIG. 2B with molding material inserted in the top mold cavity.
FIG. 3B is a perspective view of the antenna element of FIG. 3A with molding material coupled to a top portion of the antenna element.

FIG. 3A illustrates the mold 100 of FIG. 2B, after molding material 112 has been injected into the top mold cavity 110. For example, molding material may be injected into the top mold cavity 110 after the mold 100 is closed so that the molding material 112 is formed about (e.g., coupled to, etc.) a top portion of antenna element 106. As described herein, the molding material 112 may be referred to as an a molded helical antenna housing, etc.

FIG. 3B illustrates the antenna element 106 after the molding material 112 has been inserted into the top mold cavity 110. As shown in FIG. 3B, the molding material 112 couples to a top portion of the antenna element 106. Accordingly, the injected molding material 112 may form a top portion of a molded helical antenna housing for the antenna element 106. The molding material 112 (e.g., helical antenna housing, etc.) in FIG. 3B defines a shape corresponding to the interior shape of top mold cavity 110. As should be apparent, the shape of molding material 112 in FIG. 3B is provided for purposes of illustration only, and other embodiments may include antenna housings having other shapes, etc.

The molding material 112 may include any suitable molding material, including a plastic material, etc. In some embodiments, thermoplastic polyurethane may be used. For example, TEXIN 950U may be used as the molding material 112. The molding material may include aromatic polyether-based thermoplastic polyurethane, and may have a Shore D hardness of approximately 50. The molding material 112 may be ultraviolet (UV) stabilized. The molding material 112 may be injected using any suitable injection molding techniques, injection molding machines, equipment, etc.

Figure 4B:
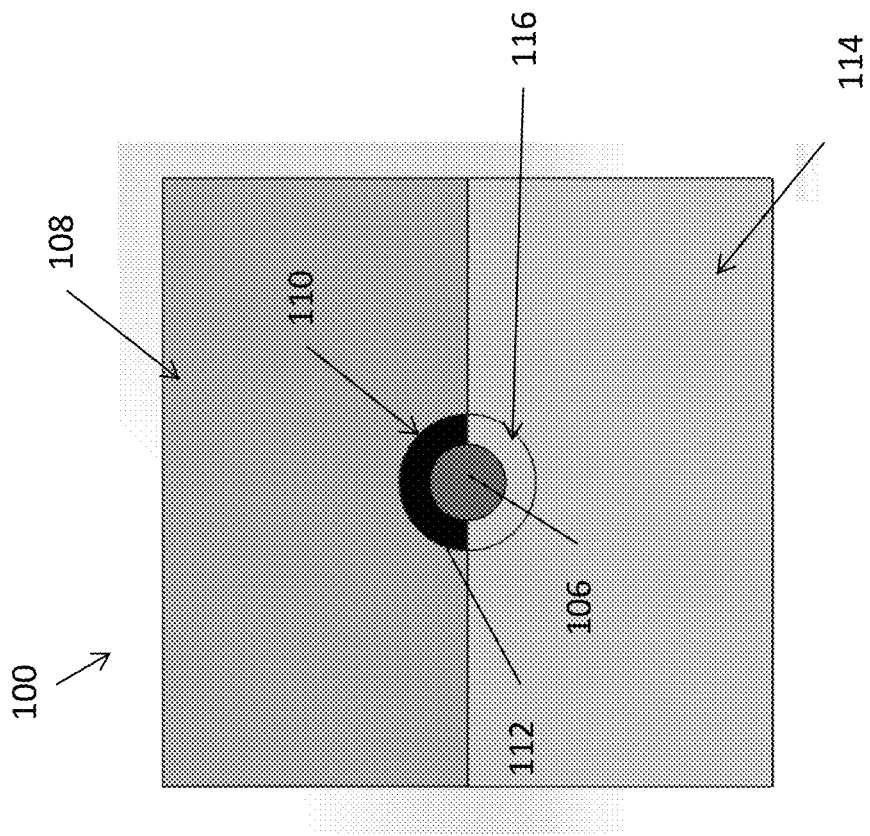
FIGS. 4A and 4B are end views of the mold of FIG. 3A, after the first bottom mold core is removed and a new bottom mold core is added.
Figure 4A:
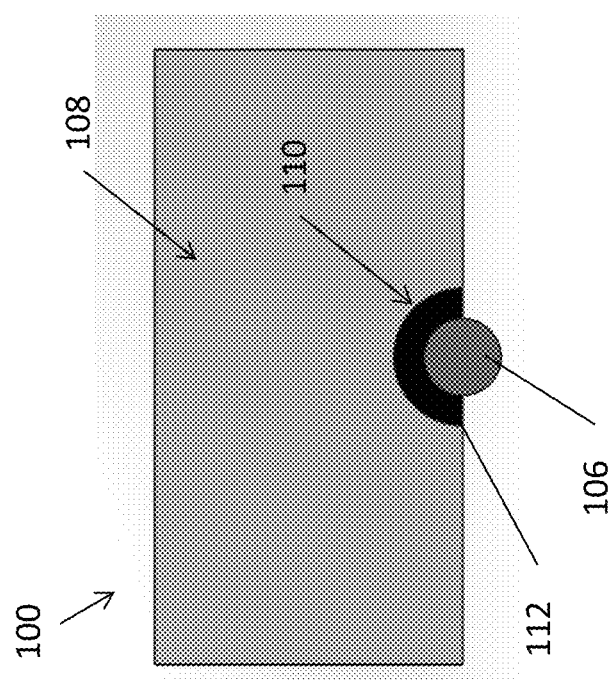

FIG. 4A illustrates the mold 100 after the bottom mold core 102 is removed. The antenna element 106 and molding material 112 (e.g., the antenna housing, etc.) may remain in the top mold cavity 110 of top mold core 108 after the bottom mold core 102 is removed (e.g., due to adhesion between the molding material 112 and the top mold cavity 110, due to undercut features of the antenna housing molding material 112, etc.).

FIG. 4B illustrates a second bottom mold core 114 closed about a bottom portion of the antenna element 106. As illustrated, the second bottom mold core 114 contacts the top mold core 108.

The second bottom mold core 114 may be similar to the first bottom mold core 102, but the second bottom mold core 114 includes a larger bottom mold cavity 116. The larger bottom mold cavity 116 creates a gap between the bottom portion of antenna element 106 and the second bottom mold core 114. The bottom mold cavity 116 may allow for injection of additional molding material into the bottom mold cavity 116 to couple to a bottom portion of the antenna element 106 (e.g., in order to form a bottom portion of the helical antenna housing, etc.).

As illustrated in FIG. 4B, the bottom mold cavity 116 may have a larger radius than the radius of the antenna element 106. Although bottom mold cavity 116 is illustrated as having a symmetrical shape to top mold cavity 110, it should be apparent that other embodiments may include top and bottom mold cavities with different shapes, etc.

Figure 5B:
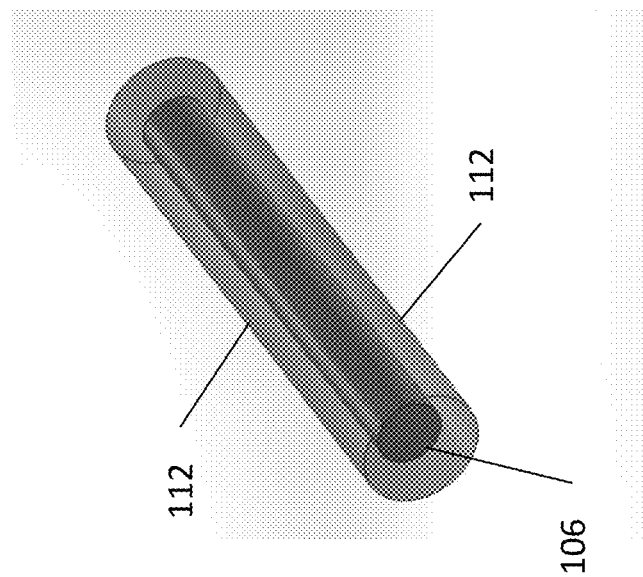
FIG. 5B is a perspective view of the antenna element of FIG. 5A with molding material coupled to a top portion and a bottom portion of the antenna element.
Figure 5A:
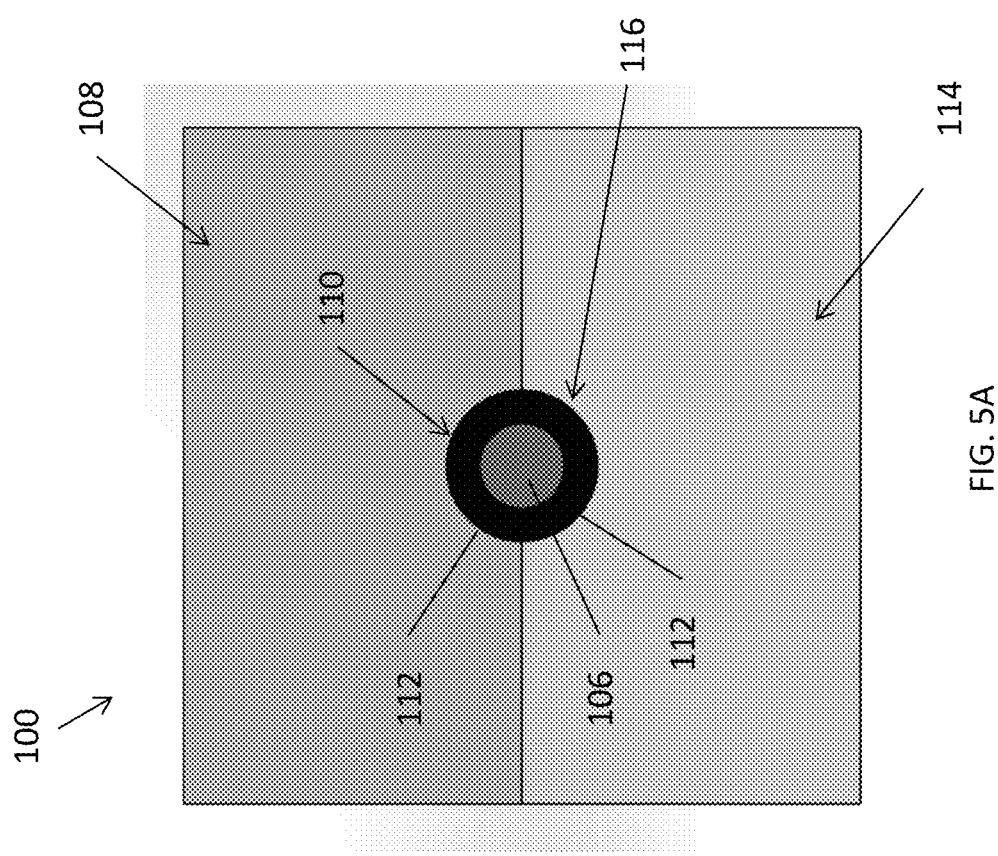
FIG. 5A is an end view of the mold of FIG. 4B with an injection of molding material into the bottom mold cavity.

FIG. 5A illustrates the mold 100 after an injection of molding material 112 into the bottom mold cavity 116. As shown in FIG. 5A, the molding material 112 couples to a bottom portion of the antenna element 106. Therefore, after the second injection of molding material 112 into the bottom mold cavity 116, the molding material 112 surrounds the antenna element 106 to form an upper and lower portion of a molded helical antenna housing.

FIG. 5B illustrates the antenna element 106 surrounded by the molding material 112 on both upper and lower sides of the antenna element 106 (e.g., after the antenna element 106 and the molded antenna housing have been removed from mold 100). The molding material 112 in FIG. 5B defines a shape corresponding to the interior shape of top mold cavity 110 and bottom mold cavity 116. As should be apparent, the shape of antenna housing molding material 112 in FIG. 5B is provided for purposes of illustration only, and other embodiments may include molded portions having other shapes, etc.

Figure 6:
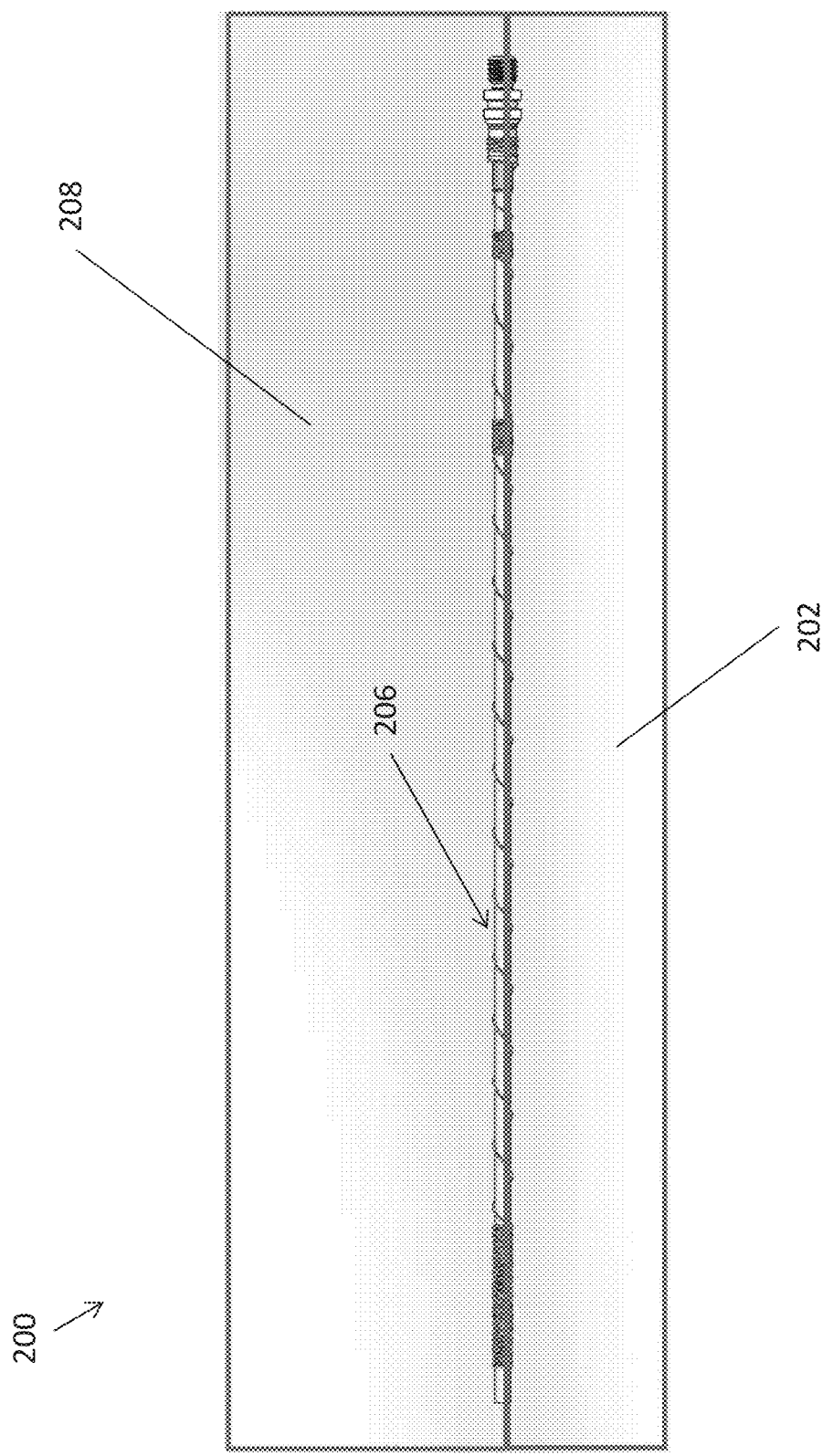
FIG. 6 is a side sectional view of a mold housing an antenna element according to another example embodiment of the present disclosure.

Referring now to FIG. 6, another example embodiment of mold 200 for a helical antenna includes a bottom mold core 202 and a top mold core 208. FIG. 6 is a sectional view of the mold 200 illustrating an antenna element 206 (e.g., antenna sub-assembly, etc.) positioned in the mold 200.

For example, the antenna element 206 may be positioned in mold cavities (not shown) of the bottom mold core 202 and the top mold core 208. The mold 200 is illustrated prior to any injection of molding material. As shown in FIG. 6, the antenna element 206 includes a helical shape.

Figure 7:
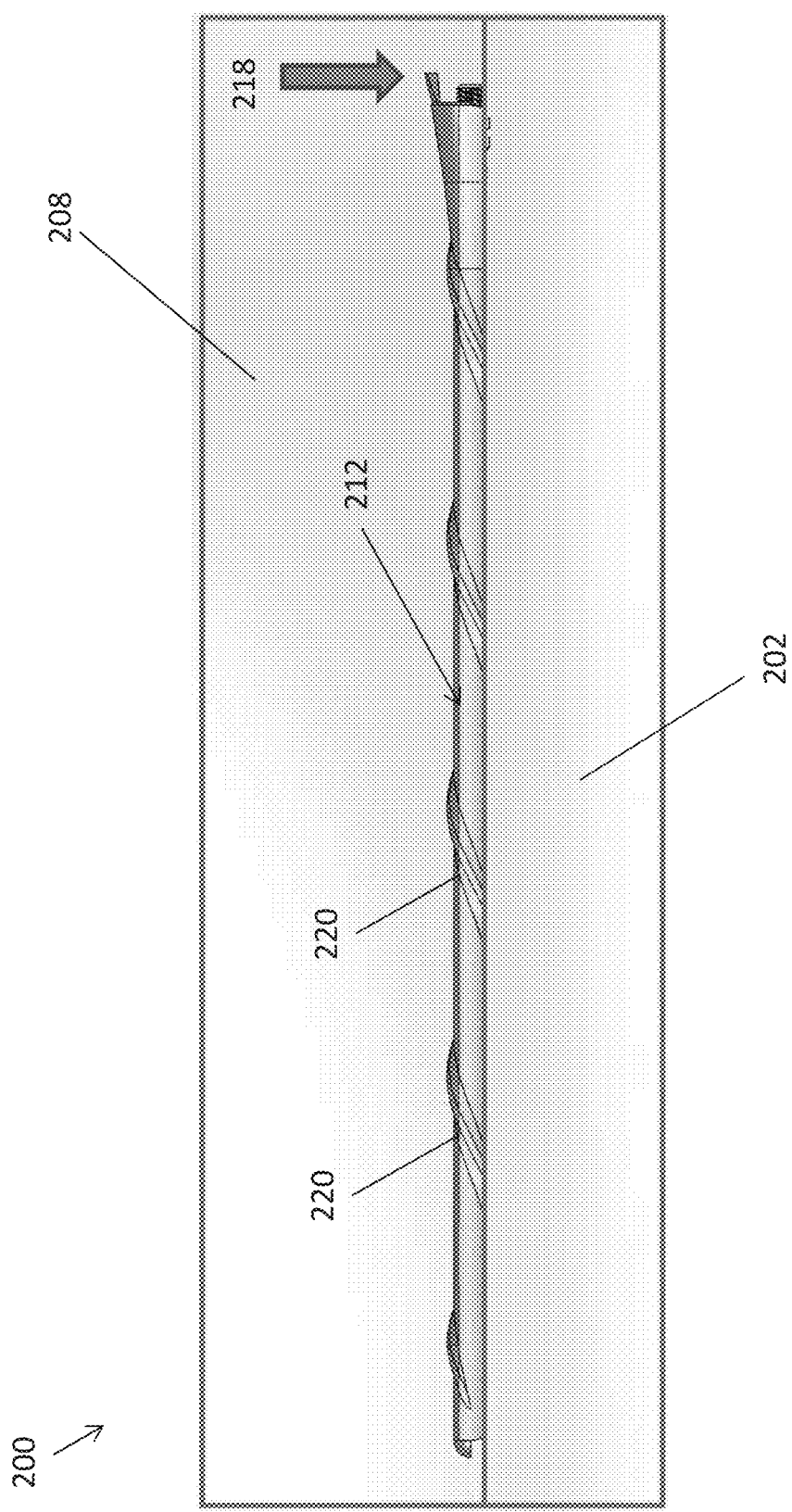
FIG. 7 is a side sectional view of the mold of FIG. 6 after an injection of molding material into a top mold cavity.

As illustrated in FIG. 7, molding material 212 is injected into a top mold cavity (not shown) of the top mold core 208. The molding material 212 may be injected into the top mold cavity through a gate 218 (e.g., opening, entry point, etc.) of the top mold core 208 that allows molding material to be injected into the top mold cavity from outside the top mold core 208.

As shown in FIG. 7, the molding material 212 couples to a top side of the antenna element, to form a top portion of the molded helical antenna housing. The molding material 212 forms multiple helical portions 220 that wrap around the antenna element, to form the molded helical antenna housing.

Figure 8:
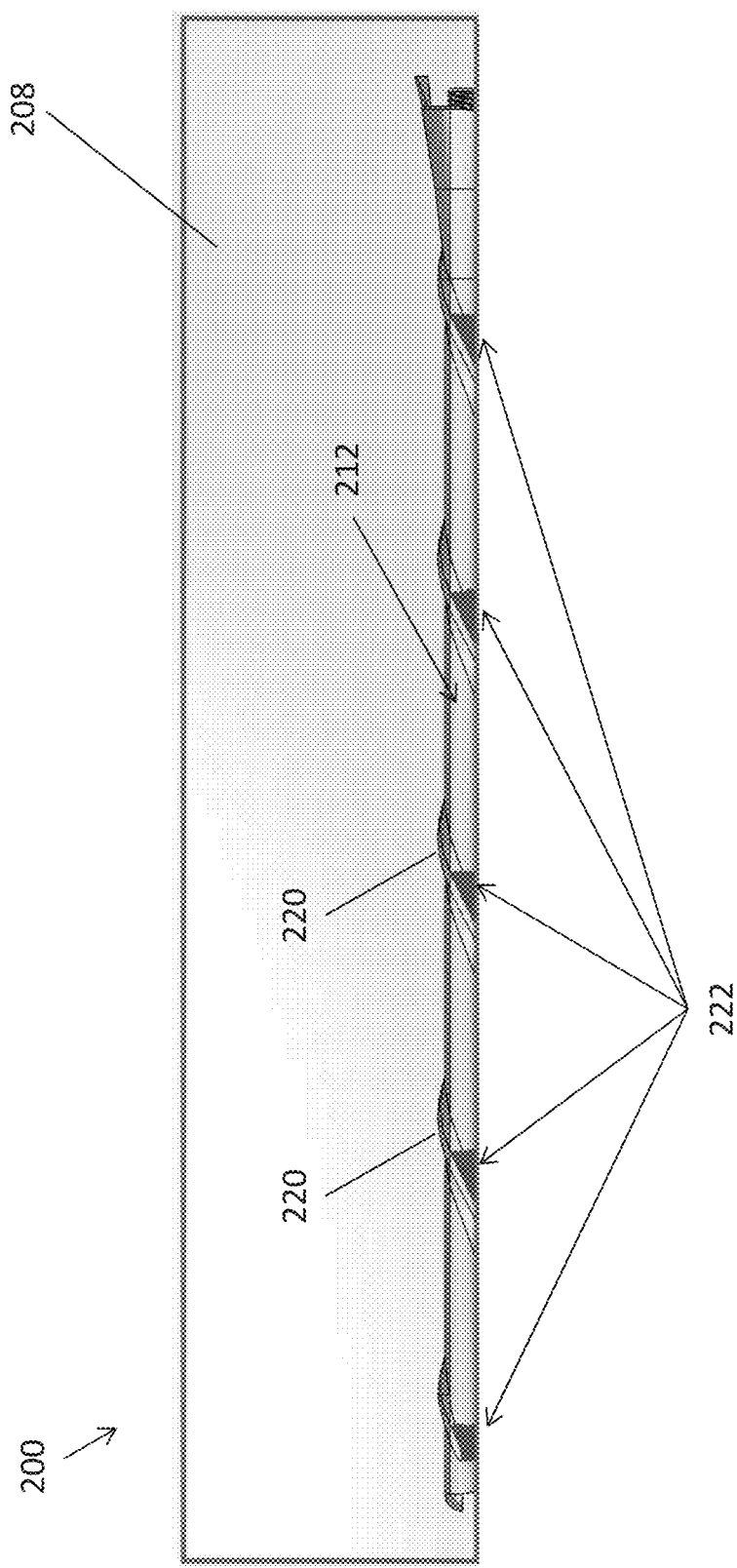
FIG. 8 is a side sectional view of the mold of FIG. 7 after the bottom mold core is removed.

FIG. 8 illustrates the mold 200 of FIG. 7 after the bottom mold core 202 is removed (e.g., the mold 200 is opened, etc.). As shown, the antenna element and molding material 212 (e.g., the antenna housing, etc.) remains in the top mold core 208.

The helical portions 220 of the molding material create undercut areas 222 below the helical portions 220. The undercut areas 222 may cause the antenna element and molding material 212 to stick to the top mold cavity of top mold core 208 after the mold 200 is opened (e.g., after bottom mold core 202 is removed, etc.).

The undercut areas 222 may inhibit (e.g., prevent, etc.) the antenna element and molding material 212 from being removed from the top mold core 208, because the undercut areas 222 may cause the helical portions 220 to contact helical grooves in the top mold cavity such that the helical portions 220 cannot move past the helical grooves if the molded antenna housing is pulled downwards, etc.

Figure 9:
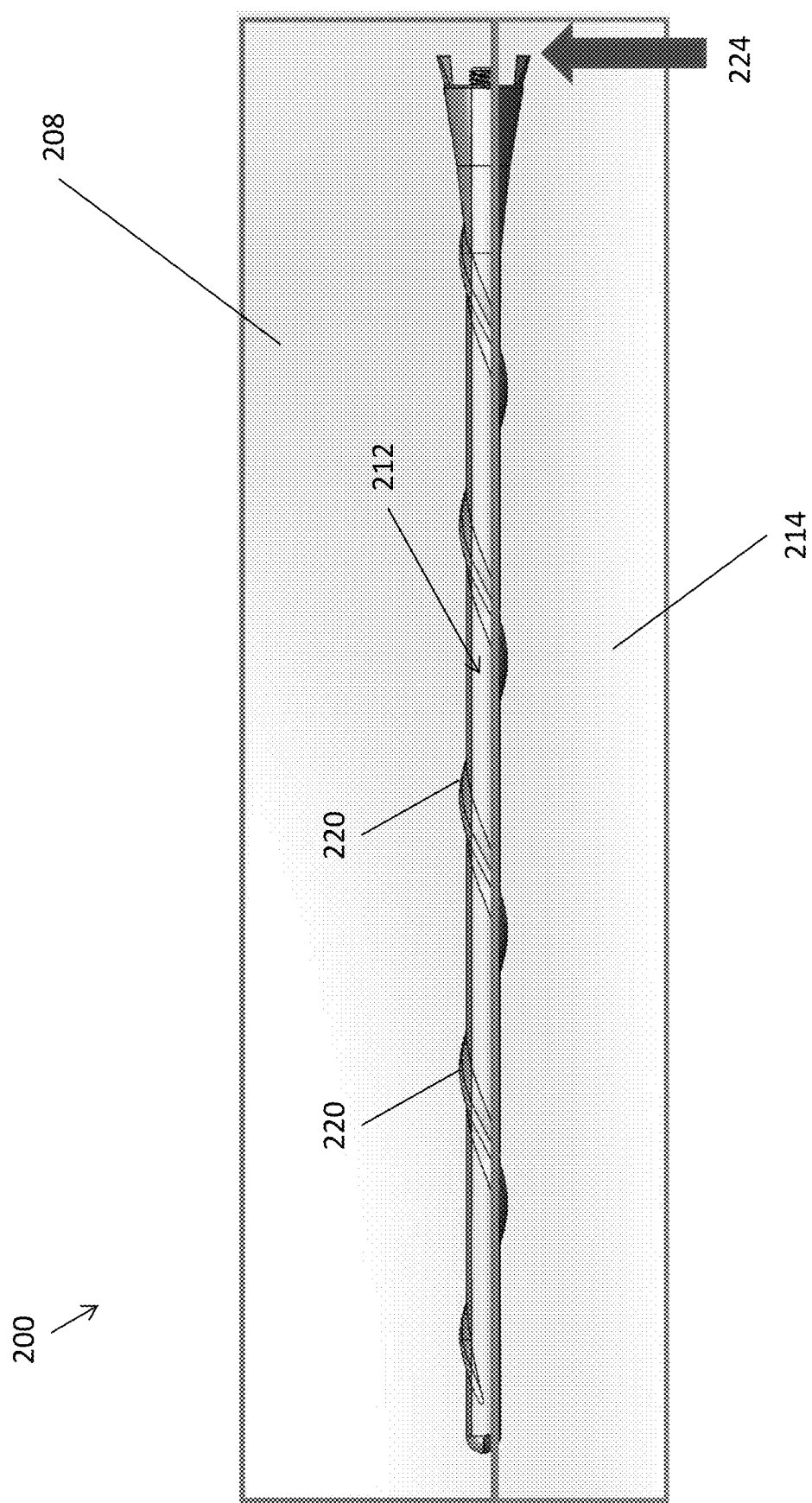
FIG. 9 is a side sectional view of the mold of FIG. 8 after a second injection of molding material about a bottom portion of the antenna element.

FIG. 9 illustrates the mold 200 after a second bottom mold core 214 is positioned below the antenna element. For example, the mold 200 is closed such that the second bottom mold core 214 contacts the top mold core 208. The second bottom mold core 214 includes a second bottom mold cavity (not shown) having a greater radius than a bottom portion of the antenna element, thereby allowing more molding material 212 to be injected about the bottom portion of the antenna element.

As illustrated in FIG. 9, molding material 212 is injected into the bottom mold cavity (not shown) of the second bottom mold core 214. The molding material 212 may be injected into the second bottom mold cavity through a gate 224 (e.g., opening, entry point, etc.) of the second bottom mold cavity that allows molding material to be injected into the second bottom mold cavity from outside the second bottom mold core 214.

As shown in FIG. 9, the molding material 212 couples to a bottom side of the antenna element, to form a bottom portion of the molded helical antenna housing. The molding material 212 on the bottom portion of the helical antenna may complete the multiple helical portions 220 that wrap around the antenna element, to form the molded helical antenna housing. For example, the bottom parts of the helical portions 220 formed by the second injection of molding material 212 into the second bottom mold cavity may correspond to the top parts of the helical portions 220 formed by the first injection of molding material 212 into the top mold cavity of the top mold core 208.

Figure 10:
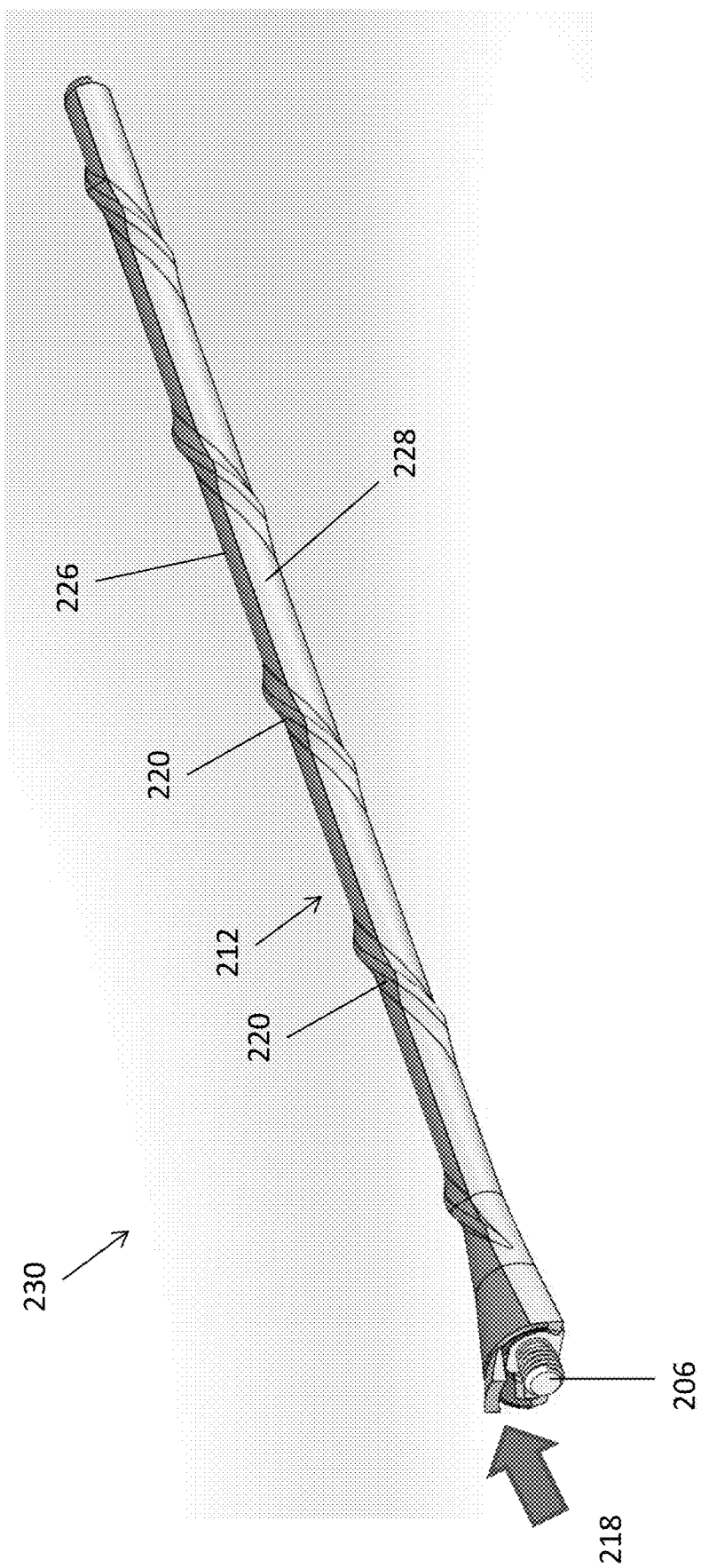
FIG. 10 is as perspective view of the antenna element of FIG. 7 after the first injection of molding material about a top portion of the antenna element.

FIG. 10 illustrates the antenna element 206 after the first injection of molding material 212 about a top portion of the antenna element 206 (e.g., to form only a part of the molded helical antenna housing, etc.). For example, FIG. 10 illustrates a view of the antenna element 206 if it were to be removed from the mold 200 after the first injection of molding material 212 into the top mold cavity of top mold core 208 as illustrated in FIG. 7.

As shown in FIG. 10, after the molding material 212 is injected at a gate 218, the molding material forms a top portion 226 of the molded helical antenna housing 230, and two side portions 228 of the molded helical antenna housing 230 (one of the side portions 228 is on a back side of the molded helical antenna housing 230 illustrated in FIG. 10). The molded helical antenna housing 230 includes helical portions 220.

In some embodiments, the top portion 226 of the top portion 226 of the molded helical antenna housing 230 may be formed by a fixed portion of the top mold core 208. The side portions 228 of the molded helical antenna housing 230 may be formed by moveable sliders of the top mold core 208.

Figure 11:
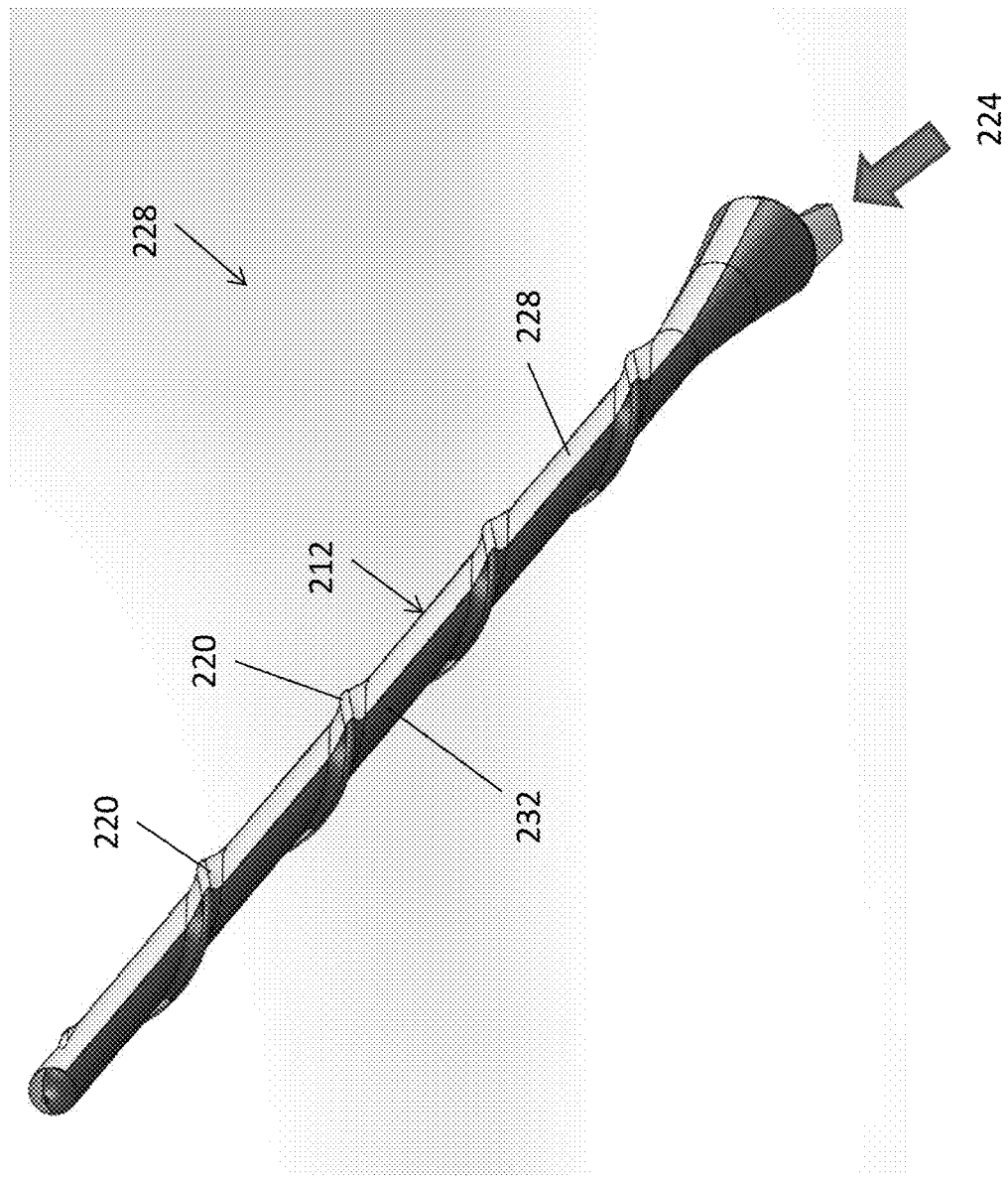
FIG. 11 is a bottom perspective view of the antenna element of FIG. 10.

FIG. 11 illustrates the molded helical antenna housing 230 after the second injection of molding material 212 about a bottom portion of the antenna element 206. For example, FIG. 11 illustrates a view of the antenna element 206 if it were to be removed from the mold 200 after the second injection of molding material 212 into the second bottom mold cavity of the second bottom mold core 214 as illustrated in FIG. 9.

As shown in FIG. 11, after the molding material 212 is injected at a gate 218, the molding material forms a bottom portion 232 of the molded helical antenna housing 230. The bottom portion 232 of molded helical antenna housing 230 completes the helical portions 220.

Figure 12:
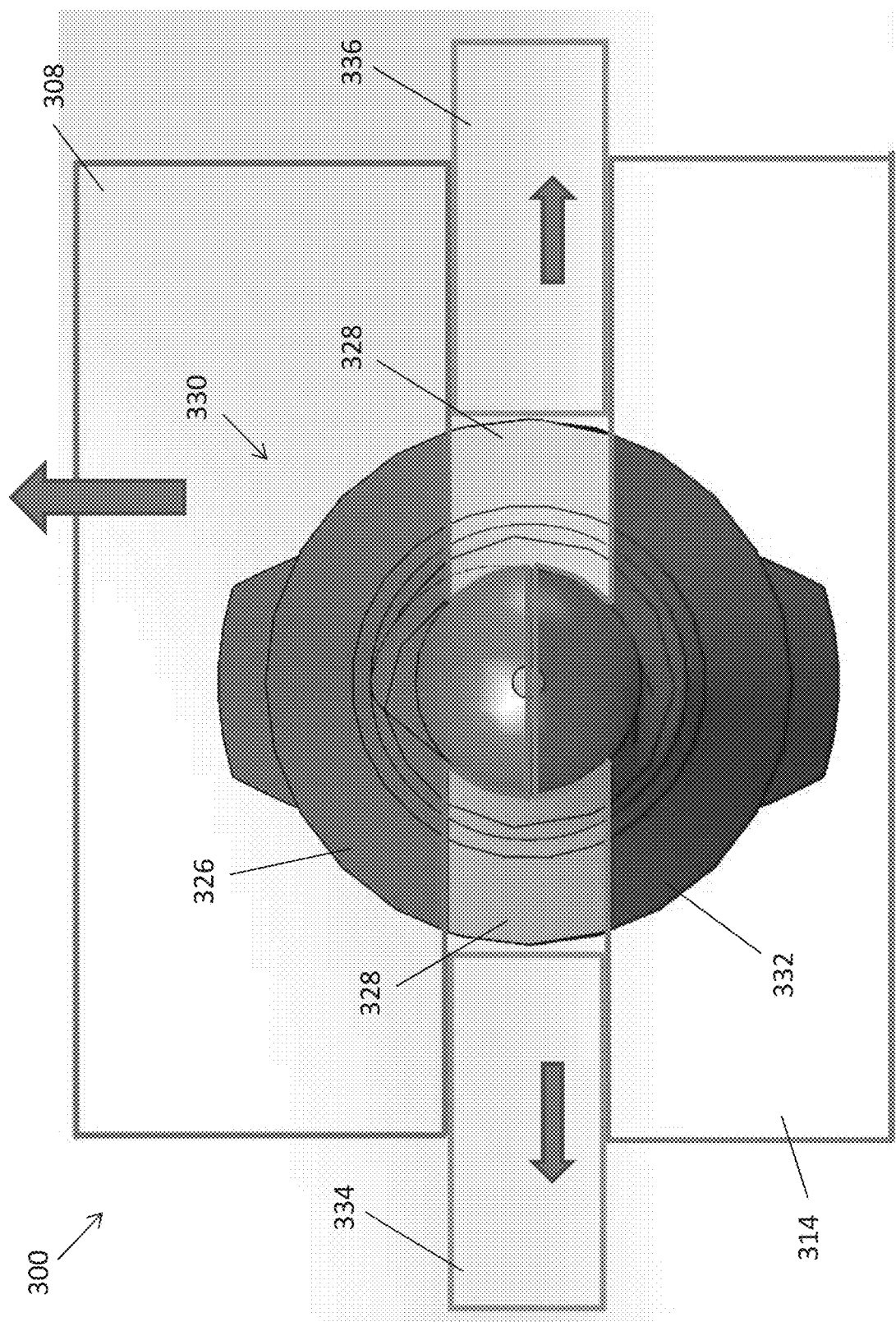
FIG. 12 is an end view of a mold for a helical antenna according to another example embodiment of the present disclosure.

FIG. 12 illustrates a mold 300 for a helical antenna housing 330 according to another example embodiment of the present disclosure. The mold 300 includes a top mold core 308 and a bottom mold core 314. The mold 300 also includes a first slider 334 (e.g., left slider, etc.) and a second slider 336 (e.g., right slider, etc.). The first slider 334 and second slider 336 may be positioned on opposite sides of the mold 300.

The mold 300 may be used to form the helical antenna housing 330. For example, the top mold core 308 and sliders 334 and 336 may define a first cavity for receiving an antenna element. Molding material may then be injected into the cavity to form the top portion 326 and two side portions 328 of the helical antenna housing 330.

The bottom mold core 314 may define a bottom cavity for coupling about a bottom side of the antenna element. Molding material may then be injected into the bottom cavity to form the bottom portion 332 of the helical antenna housing 330.

After the molding material has been injected to from the molded helical antenna housing 330, the top mold core may be lifted to release the molded helical antenna housing 330. When the top mold core 308 is lifted (e.g., moved upwards, etc.) it may cause the sliders 334 and 336 to move outwards away from the molded helical antenna housing 330.

The first slider 334 may move to the left and the second slider 336 may move to the right to release the molded helical antenna housing 330. The movement of the sliders 334 and 336 may release undercut features of the helical antenna housing 330, thereby allowing the helical antenna housing 330 to be removed from the top mold core 308. For example, without sliders 334 and 336 the molded helical antenna housing 330 may be inhibited from removal from the top mold core 308 due to undercut features of the helical portions of the molded helical antenna housing 330. However, moving the sliders 334 and 336 away from the molded helical antenna housing 330 may release the undercut features such that the molded helical antenna housing 330 can be removed from top mold core 308. In some embodiments, movement of the sliders 334 and 334 may be triggered by movement (e.g., lifting, etc.) of the top mold core 308.

Figure 13:
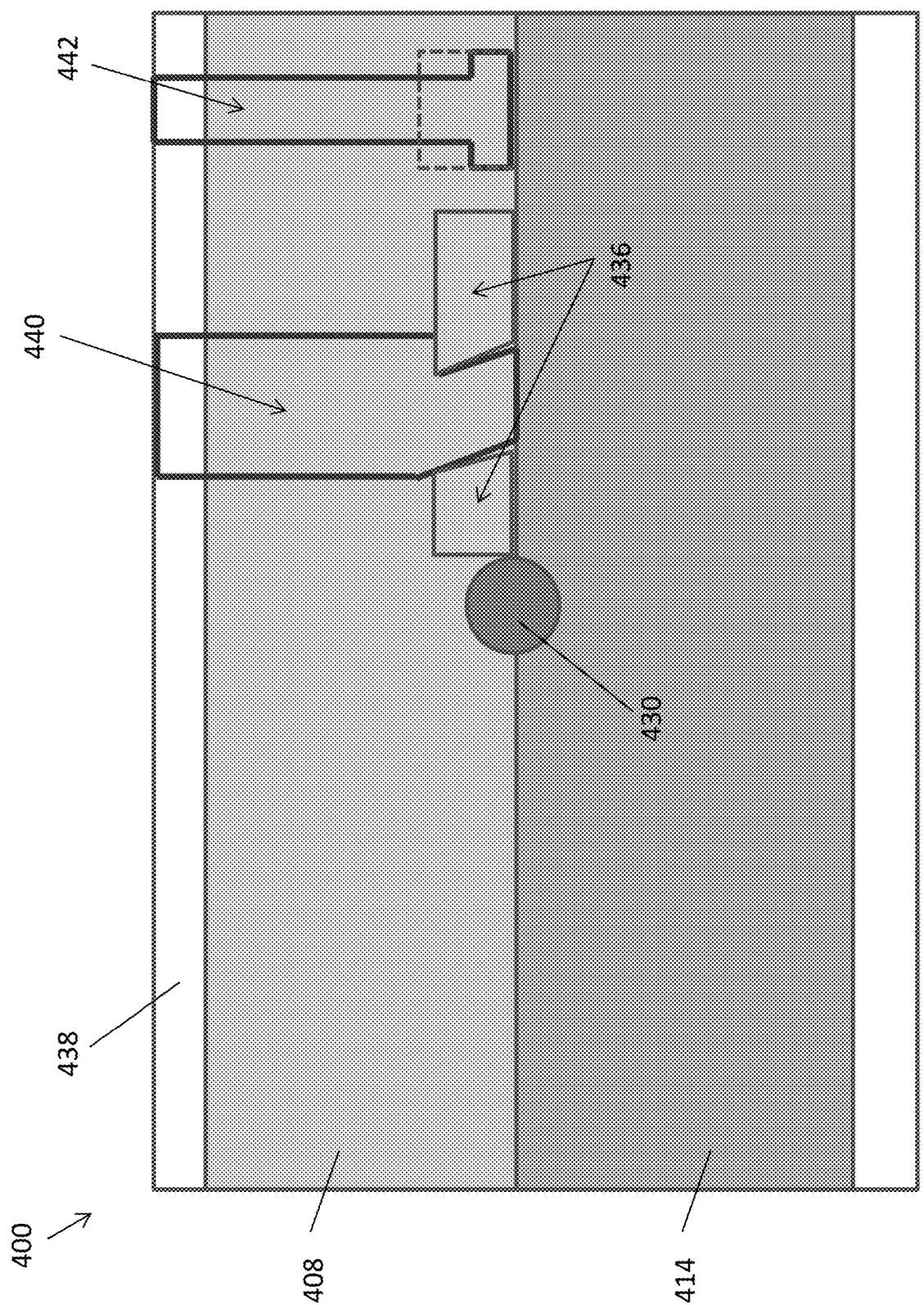
FIG. 13 is an end sectional view of another mold illustrating a mechanism for removing the antenna from the mold, according to another example embodiment of the present disclosure.

FIG. 13 provides further detail of an example mechanism for moving a slider 436 away from the helical antenna housing 430 after the helical antenna housing 430 has finished molding. As shown in FIG. 13, the mold 400 includes a top mold core 408 and a bottom mold core 414 closed about the helical antenna housing 430.

Figure 14:
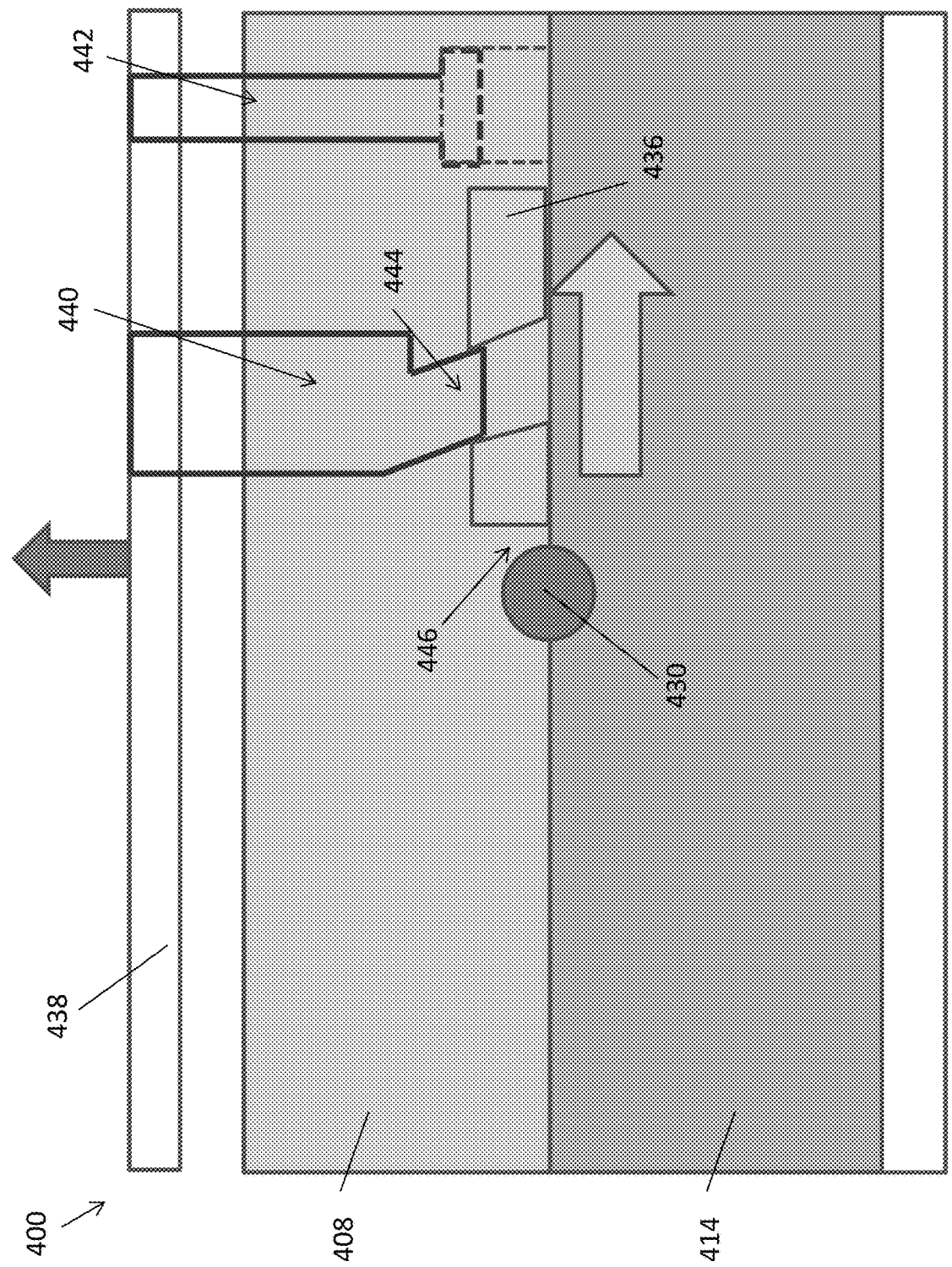
FIG. 14 is an end sectional view of the mold of FIG. 13, illustrating a slider moving away from the helical antenna.

Top mold core 408 includes a backing plate 438. The backing plate 438 is coupled to a slider cam 440 and a bolt 442 (e.g., a stripple bolt, etc.). As illustrated in FIG. 14, when the backing plate 438 is lifted upwards (e.g. during opening of mold 400) the slider cam 440 and bolt 442 are also lifted upwards.

The movement of the slider cam 440 may cause the slider 436 (e.g., sliding element, etc.) to move away from helical antenna housing 430, due to the diagonal end portion 444 of the slider cam 440. For example, as the slider cam 440 moves upwards, the diagonal end portion pushes the slider 436 to the right and away from the helical antenna housing 430. For example, the slider cam 440 may include an offset angle relative to the corresponding slider 436, such that the slider cam 440 causes the corresponding slider 436 to move away from the helical antenna housing 430 when the slider cam 440 is lifted upwards.

The movement of the slider 436 away from the helical antenna housing 430 may release undercut features of the helical antenna housing 430 at location 446. As shown in FIG. 14, at location 446 the slider 436 moves away from the helical antenna housing 430 such that the slider 436 no longer contacts the helical antenna housing 430. This may release any helical portions, undercut features, etc. of the helical antenna housing 430 that were previously coupled to the slider 436.

Figure 15:
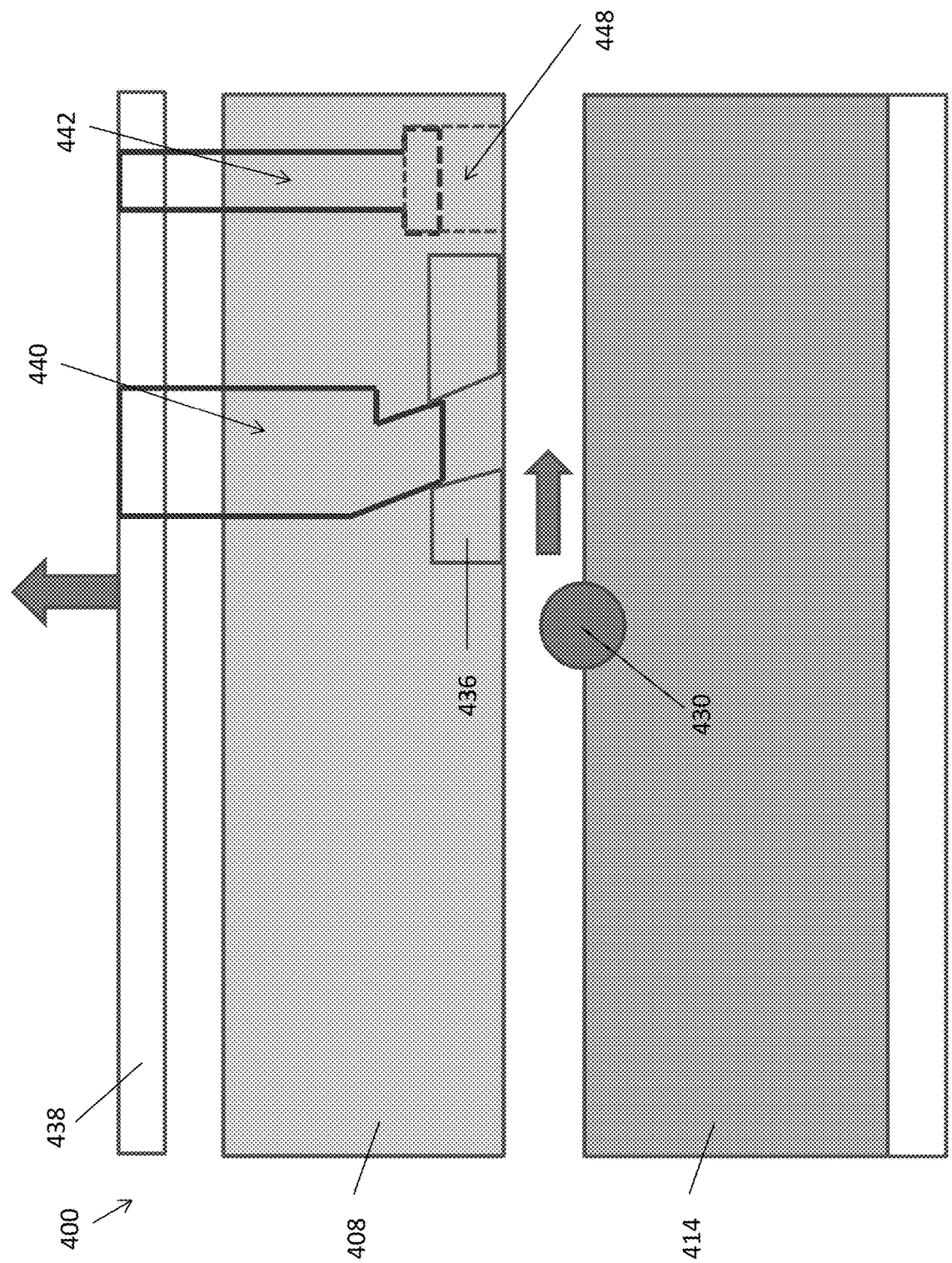
FIG. 15 is an end sectional view of the mold of FIG. 14, illustrating the top mold core being lifted away from the helical antenna.

FIG. 15 illustrates further opening of the mold 400. As the backing plate 438 is lifted higher, the bolt 442 engages cavity 448 of the top mold core 408. The bolt 442 causes the top mold core 408 to also be lifted (e.g., by the bolt 442, the backing plate 438, etc.). For example, a head of bolt 442 may contact a surface of the cavity 448 to lift the top mold core 408 as the backing plate 438 is lifted.

Once the top mold core 408 is lifted away from the bottom mold core 414 and helical antenna housing 430, the helical antenna housing 430 may be removed from the bottom mold core 414. Therefore, the backing plate 438, slider cam 440 and bolt 442 may cause the slider 436 to move away from the helical antenna housing 430 as the backing plate 438 is lifted to a first position (e.g., FIG. 14, etc.), thereby releasing the undercut features of the helical antenna. As the backing plate 438 is lifted further to a second position (e.g., FIG. 15, etc.) the top mold core 408 may be removed, thereby allowing helical antenna housing 430 to be removed from the bottom mold core 414.

Figure 16:
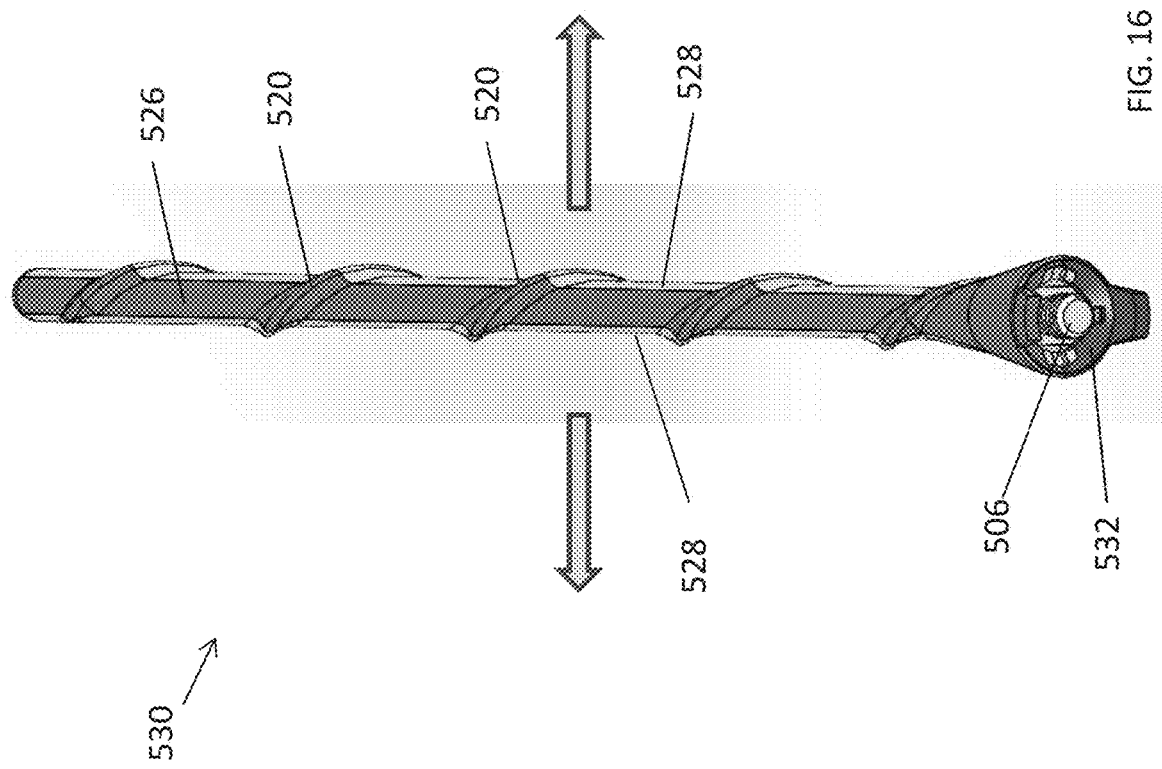
FIG. 16 is a top perspective view of a molded helical antenna, according to another example embodiment of the present disclosure.

FIG. 16 illustrates a top perspective view of a helical antenna 530 after molding is complete, according to another example embodiment. As shown in FIG. 16, the helical antenna housing 530 includes a top portion 526, two side portions 528, and a bottom portion 532 of molding material molded about antenna element 506.

The helical antenna housing 530 includes multiple helical portions 520 that define undercut features when the helical antenna housing 530 is being molded in a mold cavity (not shown). The arrows on opposite sides of the helical antenna housing 530 indicate the direction in which sliders (not shown) of the mold would move away from the helical antenna housing 530 to release the undercut features of the helical antenna.

Figure 17:
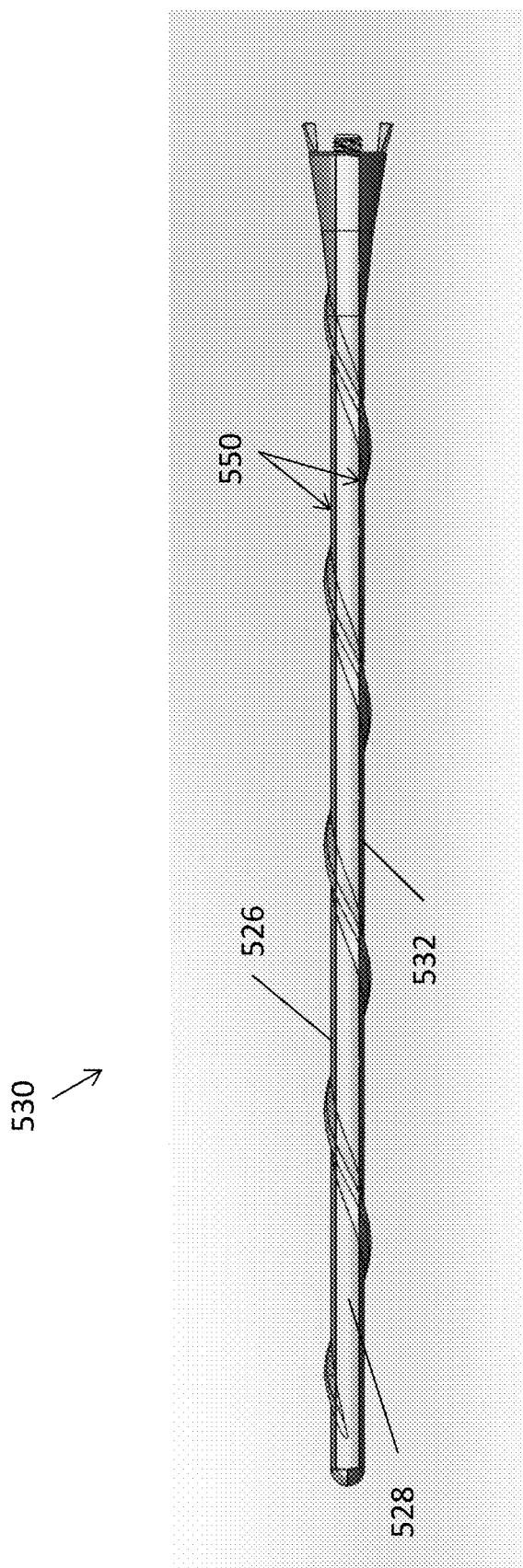
FIG. 17 is a side view of the helical antenna of FIG. 16 illustrating parting lines on the sides of the antenna.

FIG. 17 illustrates a side view of the helical antenna housing 530 of FIG. 16. As shown in FIG. 17, the helical antenna housing includes two parting lines 550 on each side (opposite side parting lines 550 not shown). Each parting line 550 defines a transition between either the top portion 526 of the molding material and one of the side portions 528 of the molding material, or a transition between the bottom portion 532 of the molding material and one of the side portions 528 of the molding material.

As shown in FIGS. 16 and 17, the molded helical antenna housing 530 may be substantially cylindrical. The molded helical antenna housing 530 includes a spiral helical protrusion (e.g. helical portions 520) extending from a surface of the molded helical antenna housing 530. The spiral helical protrusion extends about a circumference of the molded helical antenna housing 530. In FIGS. 15 and 17, the spiral helical protrusion extends about a circumference of the molded helical antenna housing 530 at least about three times. In other embodiments, the helical protrusion may wrap around the antenna housing 530 more or less times.

FIGS. 16 and 17 illustrate the antenna element 506 including an antenna connector at one end adapted to transmit and/or receive signals from an antenna source. The molded portions of the helical antenna housing 530 define an opening at one end, thereby exposing the antenna connector of the antenna element 506. This may allow the antenna connector of antenna element 506 to be coupled to an antenna source, etc.

According to another exemplary embodiment, a method of molding a helical antenna housing is disclosed. The exemplary method generally includes placing an antenna element between a top mold core and a first bottom mold core, and injecting molding material into a first mold cavity defined by at least the top mold core, thereby forming a top portion of the helical antenna housing and two opposite side portions of the helical antenna housing. The method also includes removing the first bottom mold core and placing a second bottom mold core about the antenna element, and injecting molding material into a second mold cavity defined by at least the second bottom mold core, thereby forming a bottom portion of the helical antenna housing.

In some embodiments, the top mold core includes a first sliding element and a second sliding element, and the method further includes moving the first sliding element away from the helical antenna housing and moving the second sliding element away from the helical antenna housing to release the helical antenna housing from the top mold core.

The helical antenna housing may be adapted to remain in the top mold core until the first sliding element and the second sliding element are moved away from the helical antenna housing. For example, the top portion and the two opposite side portions of the helical antenna housing may be adapted to remain in the top mold core when the first bottom mold core is removed from the top mold core.

The helical antenna housing top portion, bottom portion and two opposite side portions may define four mold portions of the helical antenna, and the helical antenna housing may include four parting lines indicative of boundaries between the four mold portions of the helical antenna housing.

In some embodiments, the helical antenna housing may be substantially cylindrical. The helical antenna housing may include a spiral helical protrusion extending from a surface of the helical antenna housing. The spiral helical protrusion may extend about a circumference of the helical antenna housing (e.g., at least three times, etc.).

An antenna connector may be coupled to one end of the antenna element and adapted to transmit and/or receive signals from an antenna source. For example, the helical antenna housing may define an opening at one end, thereby exposing the antenna connector.

Injecting the molding material may include injecting the molding material at an end of the antenna element. The molding material may include a plastic material, a thermoplastic polyurethane, etc.

Moving the sliding elements may include pulling the sliding elements away from the helical antenna housing in lateral directions opposite one another. The lateral direction may be perpendicular to a movement of the top mold core and a movement of the bottom mold core during opening of the mold cores.

In some embodiments, the top mold core may include at least one slider cam and at least one slider bolt adapted to hold one of the sliding elements in place during injection of the molding material, and opening the mold may move the slider cam and slider bolt upwards, thereby allowing said sliding element to be moved away from the helical antenna housing. The slider cam may include a diagonal end portion in contact with said sliding element, such that the slider cam causes the corresponding sliding elements to move away from the helical antenna housing when the slider cam is lifted upwards during opening of the top mold core.

Example embodiments described herein may be capable of operating according to any suitable antenna frequencies, signal protocols, etc. For example, antennas may operate using cellular frequencies (e.g., 3G, 4G, LTE, etc.), radio frequencies (e.g., AM, FM, etc.), multiple-input multiple-output (MIMO) protocols, etc. Example frequency values include, but are not limited to, about 85 MHz, 90.5 MHz, 97.5 MHz, 104.5 MHz, 110 MHz, etc.

The antennas may operate at any suitable voltage standing wave ratio (VSWR) values, including but not limited to about 1.01, 1.11, 1.18, 4.07, 4.54, 4.62, 5.12, 5.18, 5.72, etc. In some embodiments, antennas may have process capability index (CPK) values of about −5.23, 2.20, 2.42, etc.

The antennas may have any suitable shape, including but not limited to about 280 millimeters, etc. Example antenna elements may include dipole antennas, etc. Example antennas may provide mechanical performance suitable to perform one or more shock tests, flexibility tests, etc.

For example, in a shock stability test example antenna masts may return to substantially an original orientation after each bending cycle. The antennas may experience visually mild abrasion during the test. Similarly, in a flexibility test example antenna masts may return to substantially an original orientation after each bending cycle, which may include visually mild abrasion.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values (e.g., frequency ranges, etc.) for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter. The disclosure of a first value and a second value for a given parameter can be interpreted as disclosing that any value between the first and second values could also be employed for the given parameter. Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   placing an antenna element between a top mold core and a first bottom mold core;
   injecting molding material into a first mold cavity defined by at least the top mold core, thereby forming a top portion of a helical antenna housing and two opposite side portions of the helical antenna housing;
   removing the first bottom mold core and placing a second bottom mold core about the antenna element; and
   injecting molding material into a second mold cavity defined by at least the second bottom mold core, thereby forming a bottom portion of the helical antenna housing;
   wherein the helical antenna housing includes at least one helical portion of the molding material that protrudes outwardly from an exterior surface of the helical antenna housing; and
   wherein the at least one helical portion of the molding material creates at least one undercut feature that inhibits removal of the helical antenna housing from the top mold core.

2. The method of claim 1, wherein the top mold core includes a first sliding element and a second sliding element, the method further comprising moving the first sliding element away from the helical antenna housing and moving the second sliding element away from the helical antenna housing to release the helical antenna housing from the top mold core.

3. A method comprising:
   placing an antenna element between a top mold core and a first bottom mold core;
   injecting molding material into a first mold cavity defined by at least the top mold core, thereby forming a top portion of a helical antenna housing and two opposite side portions of the helical antenna housing;
   removing the first bottom mold core and placing a second bottom mold core about the antenna element; and
   injecting molding material into a second mold cavity defined by at least the second bottom mold core, thereby forming a bottom portion of the helical antenna housing;
   wherein:
      the helical antenna housing includes at least one helical portion of the molding material that protrudes outwardly from an exterior surface of the helical antenna housing;
      the top mold core includes a first sliding element and a second sliding element, the method further comprising moving the first sliding element away from the helical antenna housing and moving the second sliding element away from the helical antenna housing to release the helical antenna housing from the top mold core; and
      the at least one helical portion of the molding material creates at least one undercut feature that inhibits removal of the helical antenna housing from the top mold core such that the helical antenna housing is adapted to remain in the top mold core until the first sliding element and the second sliding element are moved away from the helical antenna housing and release the at least one undercut feature, thereby allowing the helical antenna housing to be removed from the top mold core.

4. The method of claim 2, wherein moving the sliding elements includes pulling the sliding elements away from the helical antenna housing in lateral directions opposite one another.

5. The method of claim 4, wherein the lateral direction is perpendicular to a movement of the top mold core and a movement of the second bottom mold core during opening of the mold cores.

6. The method of claim 2, wherein the top mold core includes at least one slider cam and at least one slider bolt adapted to hold one of the sliding elements in place during injection of the molding material, and wherein opening the mold moves the slider cam and slider bolt upwards, thereby allowing said sliding element to be moved away from the helical antenna housing.

7. The method of claim 6, wherein the slider cam includes a diagonal end portion in contact with said sliding element, such that the slider cam causes the corresponding sliding elements to move away from the helical antenna housing when the slider cam is lifted upwards during opening of the top mold core.

8. A method comprising:
placing an antenna element between a top mold core and a first bottom mold core;
injecting molding material into a first mold cavity defined by at least the top mold core, thereby forming a top portion of a helical antenna housing and two opposite side portions of the helical antenna housing;
removing the first bottom mold core and placing a second bottom mold core about the antenna element; and
injecting molding material into a second mold cavity defined by at least the second bottom mold core, thereby forming a bottom portion of the helical antenna housing;
wherein:
the helical antenna housing includes at least one helical portion of the molding material that protrudes outwardly from an exterior surface of the helical antenna housing;
the at least one helical portion of the molding material creates at least one undercut feature that inhibits removal of the helical antenna housing from the top mold core;
the top mold core includes at least one sliding element; and
the method further comprises moving the at least one sliding element away from the helical antenna housing to release the at least one undercut feature, thereby allowing the helical antenna housing to be removed from the top mold core.

9. The method of claim 1, wherein the top portion, bottom portion and two opposite side portions define four mold portions of the helical antenna housing.

10. The method of claim 9, wherein the helical antenna includes four parting lines indicative of boundaries between the four mold portions of the helical antenna housing.

11. The method of claim 1, wherein the helical antenna housing is substantially cylindrical.

12. The method of claim 1, wherein the at least one helical portion of the molding material includes a spiral helical protrusion extending from the exterior surface of the helical antenna housing.

13. The method of claim 12, wherein the spiral helical protrusion extends about an outer circumference of the helical antenna housing.

14. The method of claim 12, wherein:
the first and second mold cavities include helical grooves; and
the method injecting molding material into the helical grooves to thereby form the spiral helical protrusion that extends about an outer circumference of the helical antenna housing at least three times.

15. The method of claim 1, wherein an antenna connector is at one end of the antenna element, the antenna connector adapted to transmit and/or receive signals from an antenna source.

16. The method of claim 15, wherein the helical antenna housing defines an opening at one end, thereby exposing the antenna connector.

17. The method of claim 1, wherein:
at least one of the first mold cavity and the second mold cavity includes at least one helical groove; and
the method includes injecting molding material into the at least one helical groove to thereby form the at least one helical portion of the molding material.

18. The method of claim 1, wherein the helical antenna housing including the at least one helical portion are configured to reduce wind noise effects of the helical antenna housing while a vehicle including the helical antenna housing is moving.

19. The method of claim 1, wherein:
the first bottom mold core defines a first bottom mold cavity; and
the antenna element is sized to fill the first bottom mold cavity, such that the molding material injected into the first mold cavity does not contact a bottom side of the antenna element that is in the first bottom mold cavity.

* * * * *